United States Patent
Hasegawa (10) Patent No.: US 7,043,233 B2
(45) Date of Patent: May 9, 2006

(54) MESSAGING PROTOCOL OVER INTERNET PROTOCOL

(75) Inventor: Nozomu Hasegawa, Cambridge, MA (US)

(73) Assignee: Comverse, Inc., Wakefield, MA (US)

( * ) Notice: Subject to any disclaimer, the term of this patent is extended or adjusted under 35 U.S.C. 154(b) by 33 days.

(21) Appl. No.: 09/843,137

(22) Filed: Apr. 27, 2001

(65) Prior Publication Data

US 2002/0159569 A1    Oct. 31, 2002

(51) Int. Cl.
*H04M 11/10*    (2006.01)
(52) U.S. Cl. ............................. 455/412.2; 379/88.17
(58) Field of Classification Search ............ 379/88.27, 379/88.25, 88.13, 88.17, 88.18, 88.12, 68, 379/67.1; 455/413, 560, 412.2, 466
See application file for complete search history.

(56) References Cited

U.S. PATENT DOCUMENTS

| | | | |
|---|---|---|---|
| 4,549,047 A * | 10/1985 | Brian et al. | 379/88.26 |
| 5,406,557 A | 4/1995 | Baudoin | |
| 5,608,783 A | 3/1997 | Ichnowski et al. | |
| 5,689,550 A | 11/1997 | Garson et al. | |
| 5,724,410 A | 3/1998 | Parvulescu et al. | |
| 5,732,126 A | 3/1998 | Fitzpatrick et al. | |
| 5,737,394 A | 4/1998 | Anderson et al. | |
| 5,740,543 A | 4/1998 | Maeda | |
| 5,790,957 A | 8/1998 | Heidari | |
| 5,793,762 A | 8/1998 | Penners et al. | |
| 5,850,519 A | 12/1998 | Vazana | |
| 5,867,793 A | 2/1999 | Davis | |
| 5,903,832 A | 5/1999 | Seppanen et al. | |
| 5,943,399 A | 8/1999 | Bannister et al. | |
| 5,987,317 A | 11/1999 | Venturini | |
| 6,029,063 A | 2/2000 | Parvulescu et al. | |
| 6,032,039 A * | 2/2000 | Kaplan | 455/413 |
| 6,061,572 A | 5/2000 | Laiho | |
| 6,134,432 A | 10/2000 | Holmes et al. | |
| 6,138,036 A | 10/2000 | O'Cinneide | |
| 6,167,253 A | 12/2000 | Farris et al. | |
| 6,282,269 B1 * | 8/2001 | Bowater et al. | 379/88.17 |
| 6,389,276 B1 * | 5/2002 | Brilla et al. | 455/413 |
| 6,434,405 B1 * | 8/2002 | Sashihara | 455/557 |
| 6,731,926 B1 * | 5/2004 | Link et al. | 455/412.2 |
| 2001/0019951 A1 * | 9/2001 | Haumont et al. | 455/413 |

OTHER PUBLICATIONS

U.S. Appl. No. 09/205,700, filed Dec. 4, 1998, Bennett David Marks, Comverse Network Systems, Inc.

* cited by examiner

*Primary Examiner*—Fan Tsang
*Assistant Examiner*—Ming Chow
(74) *Attorney, Agent, or Firm*—Staas & Halsey LLP (57) ABSTRACT

A process of creating a resource database storing message service information, storing a message in the portable wireless telephone without establishing a voice or data channel with the message storage system, receiving in the portable wireless telephone the message service information from the resource database via a data channel between the portable wireless telephone and the resource database, processing a message responsive to the message service information via a data channel between the portable wireless telephone and the message storage system according to the message service information, and updating the message service information in the resource database by the message storage system according to the processing via a data channel between the resource database and the message storage system. Further, a computer system programmed to perform the process.

4 Claims, 6 Drawing Sheets

MESSAGING PROTOCOL OVER INTERNET PROTOCOL

BACKGROUND OF THE INVENTION

1. Field of the Invention

The present invention relates to delivery and retrieval of messages, for example, voice/video/text mail messages, from/to mobile (wireless) telephones/handsets using a data network. In particular, the present invention relates to delivery and retrieval of such messages from/to mobile handsets using an Internet Protocol (IP) data network.

2. Description of the Related Art

Typically, a mobile telephone establishes a telephone call to a voice messaging system to deposit or retrieve (listen to) voice messages via a circuit-switched telephone network, such as (without limitation) one or more wireless telephone networks, long-distance telephone networks, the public switched telephone network (PSTN) or the Personal Communications Service (PCS). The typical mobile telephone systems require the subscriber/user to access the message system through the circuit-switched telephone network for either deposit/retrieval of messages, which may not be cost efficient if, for example, the caller does not have waiting/unread messages. Further, in the typical wireless telephone system if the handset is out of radio range, the user can neither call nor leave messages for the target recipient.

In contrast to traditional phones, mobile phones are becoming small personal computing devices or computers by having more processing power and functionality. In particular, mobile handsets can now also communicate to a packet-switched data network, such as (without limitation) the Internet or another public or private local area or wide area data network. The data networks can use, for example, the Internet Protocol (IP), such as the Internet. Some of the advantages of the data network are: (1) connections via a packet-switched data network can be more reliable than connections via the circuit-switched telephone network; (2) data network connections cost less than the switched telephone network; and (3) a data network provides more flexibility in managing messaging.

Therefore, mobile phone messaging via the data network can be more flexible and cost efficient. In particular, mobile phone messaging via a data network using IP, such as the Internet, can be more flexible and cost efficient.

SUMMARY OF THE INVENTION

The present invention provides messaging to mobile handsets without using telephony interfaces.

The present invention also provides messaging to mobile handsets over an IP network.

The present invention also provides an application layer protocol to accommodate messaging to mobile handsets over an IP network.

The present invention also provides a mobile handset controlling processing of voice messages on a voice message storage system via the IP network.

According to the embodiments of the present invention, the present invention can be attained in an IP network by providing at least three logical nodes of a mobile phone (mobile handset), a data storage system and a resource database. In particular, the data storage system can be, for example, a voice messaging system (VMS), a video messaging system, audio messaging system, image messaging system, text and data messaging system, etc.

The present invention can be attained, for example, by creating a resource database storing message service information, storing a message in the portable wireless telephone without establishing a voice or data channel with the message storage system, receiving in the portable wireless telephone the message service information from the resource database via a data channel between the portable wireless telephone and the resource database, processing a message responsive to the message service information via a data channel between the portable wireless telephone and the message storage system according to the message service information, and updating the message service information in the resource database by the message storage system according to the processing via a data channel between the resource database and the message storage system.

The present invention can also be attained by controlling from a telephone, including a portable wireless telephone, processing of a voice message on a voice message storage system using a data channel with the voice message storage system.

Further, the present invention can be attained by a process, comprising recording a message for a recipient subscriber in a portable wireless telephone without establishing a voice or data channel with the message storage system, querying address of a recipient-subscriber message storage system from a resource database via a data channel between the portable wireless telephone and the resource database, transmitting the message to the recipient-subscriber message storage system via a data channel between the portable wireless telephone and the recipient-subscriber message storage system, storing the transmitted message in a mailbox for the recipient subscriber in the recipient-subscriber message storage system, updating message service information of the recipient subscriber in the resource database by the recipient-subscriber message storage system according to the storing in the mailbox via a data channel between the resource database and the message storage system, alerting automatically a recipient-subscriber portable wireless telephone with the message service information by the resource database via a data channel between the resource database and the portable wireless telephone, establishing a data channel between the recipient-subscriber portable wireless telephone and the recipient-subscriber message storage system, processing (e.g., receiving and storing) the message in the recipient-subscriber portable wireless telephone via the data channel between the recipient-subscriber portable wireless telephone and the recipient-subscriber message storage system, and updating the message service information of the recipient subscriber in the resource database by the recipient-subscriber message storage system according to the processing in the recipient-subscriber portable wireless telephone via a data channel between the resource database and the message storage system.

The processes according to embodiments of the present invention can be implemented in software to control a computer system, including computing devices, such as portable wireless telephones, to perform the processes. Advantages of the invention will be set forth in part in the following description and, in part, will be obvious from the description, or may be learned by practice of the invention.

BRIEF DESCRIPTION OF THE DRAWINGS

The advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
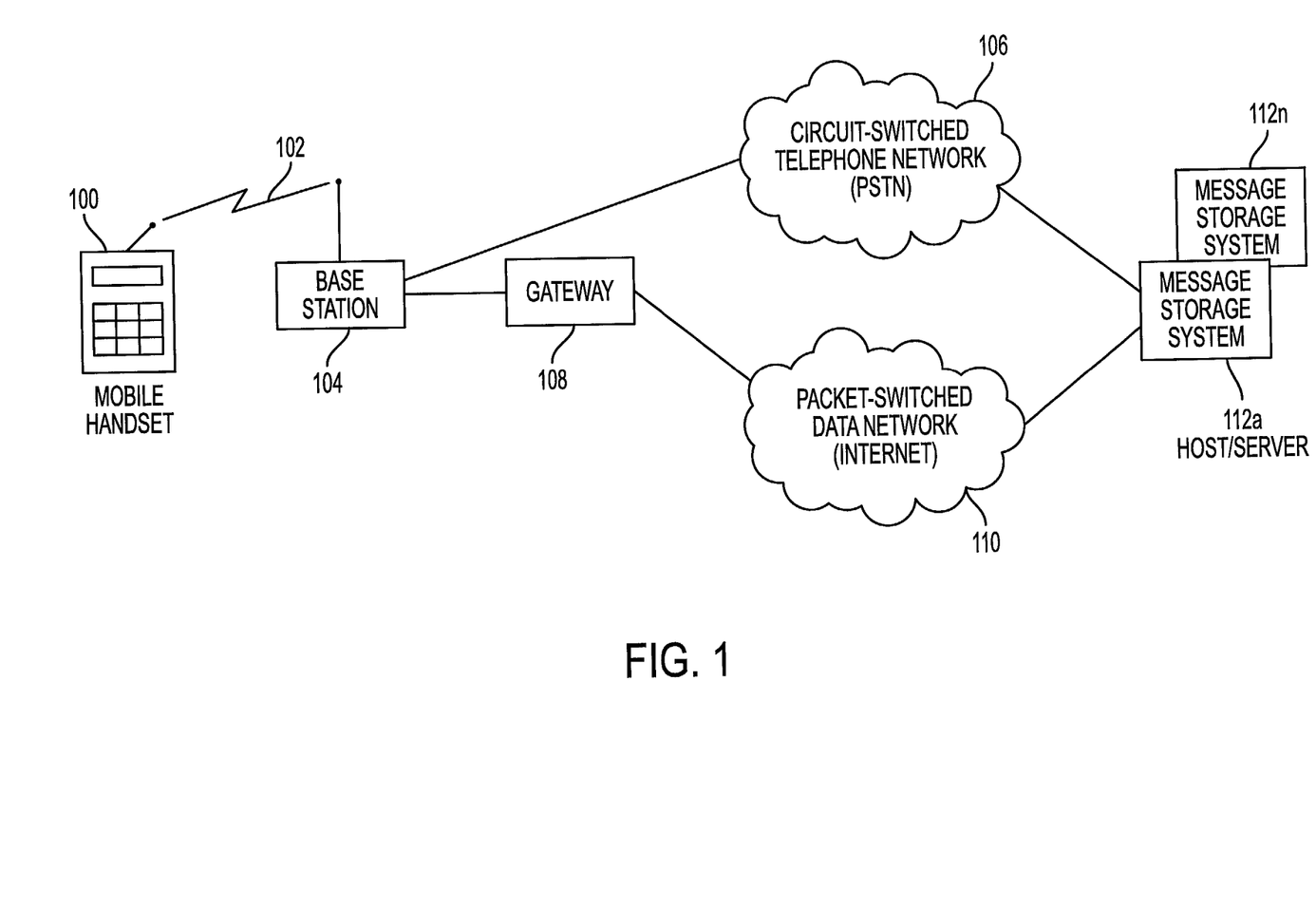
FIG. 1 is a block diagram of a wireless system in which a wireless handset is interconnected to a message storage system.

FIG. 1 illustrates a wireless handset 100 in radio communication over a wireless link 102 with a base station 104. The wireless link 102 carries voice and data channels (not shown). The base station 104 is connected to a circuit-switched telephone network (CSTN) 106, which can include (without limitation) one or more wireless telephone networks, long-distance telephone networks or the public switched telephone network (PSTN). The base station 104 routes voice calls to or from the handset 100 over the circuit-switched telephone network 106. The base station 104 is also connected via a gateway 108 to a packet-switched data network 110, such as, without limitation, the Internet or another public or private local area or wide area data network. The base station 104 routes data packets to or from the handset 100 through the gateway 108. The gateway 108 processes data packets by sending or receiving data over the packet-switched data network 106 to or from message storage systems 112a–112n, which are connected to both the circuit-switched telephone network 106 and the packet-switched data network 110. Such message storage systems are available from Comverse Network Systems, Inc., Wakefield, Mass. under the tradename AccessNP (such system being disclosed in the U.S. Pat. No. 5,029,199, incorporated herein by reference) or Trilogue INfinity enhanced services platform. In the preferred embodiment, each message storage system 112 communicates with the handset 100 via network 110, the network 110 being a mobile operator's IP network. Each message storage system 112 has an IP address and associated handsets 100.

The handset 100 can be conventional with information processing and information storage capabilities (e.g., memory, hard drives or drives for removable media) to support browser software and other software written in conventional programming languages. Handset 100 comprises, for example, a micro-browser software (not shown) to process user commands and/or provide various functions. In the preferred embodiment the handset 100 has IP connection capability to the mobile operator's IP network 110. The micro-browser can, for example, use a protocol, such as the handheld device transmission protocol (HDTP), and a language, such as the handheld device markup language (HDML), to communicate over a data channel with the gateway 108. The gateway 108 acts as a server responding to requests from, and supplying data to, the micro-browser. To satisfy some requests from the micro-browser, the gateway 108 can communicate with the message storage systems 112 using a protocol, such as the hypertext transmission protocol (HTTP), and a language, such as the hypertext markup language (HTML). Therefore, the message storage system 112 acts as a server to the gateway 108. However, functions of the handset 100 are not limited in the present invention to the above description. The handset 100 can comprise, for example, software written in commercial programming languages, such as the Java programming language. The software can include (without limitation) intelligent call flow applications and Java applets. Further, the handset 100 can establish Transport Control Protocol (TCP) or User Datagram Protocol (UDP)/IP communication (as described in more detail below) with the message storage systems 112 via the gateway 108.

Each handset 100 uses a unique identification (handset ID) on the networks 106 and 110, such as a phone number, a mobile identification number (MIN), etc. and each handset 100 is assigned (belongs) to a home message storage system 112. Although, the described exemplary embodiment uses wireless phone handsets, the present invention is not limited to a particular type of handset and other phone handsets, such as a telephone on a fixed line with IP communication capability can be used.

Because of mobile network characteristics, the mobile handset should be a client in a TCP or UDP/IP communication with message storage systems 112. Such characteristics include, for example, that in mobile networks the address/location of the handset 100 is not fixed, changing as the handset 100 moves. Further, the mobile handset 100 may not always be connected to the mobile network in a stable manner like a personal computer on a corporate local area network. In particular, mobile handsets on the mobile network using IP may have different IP addresses each session. Further, in a mobile network, the radio connection may be lost during data communication. In contrast to the mobile handset, a message storage system 112, such as a Voice Mail System (VMS), is typically stationary and connected to the mobile network. Therefore, in a TCP/IP communication the message system should be a server. With reference to FIG. 1, in another embodiment, the gateway 108 can be an HTTP server and the handset 100 can execute a web browser supporting the Java applets. The Java applet running on the handset 100 can communicate with the message storage system 112 and other nodes on the IP network 110 through the HTTP server process running on the gateway 108.

Message servers can be distributed in a large network with subscribers using different message servers. In particular, in a multimedia system environment, mobile handset 100 can subscribe to different servers for different media like voice, video, audio, image, email, text, data, etc. A directory service, such as Lightweight Directory Access Protocol (LDAP), can be used in the IP network to locate message systems storing different media type messages.

Figure 2:
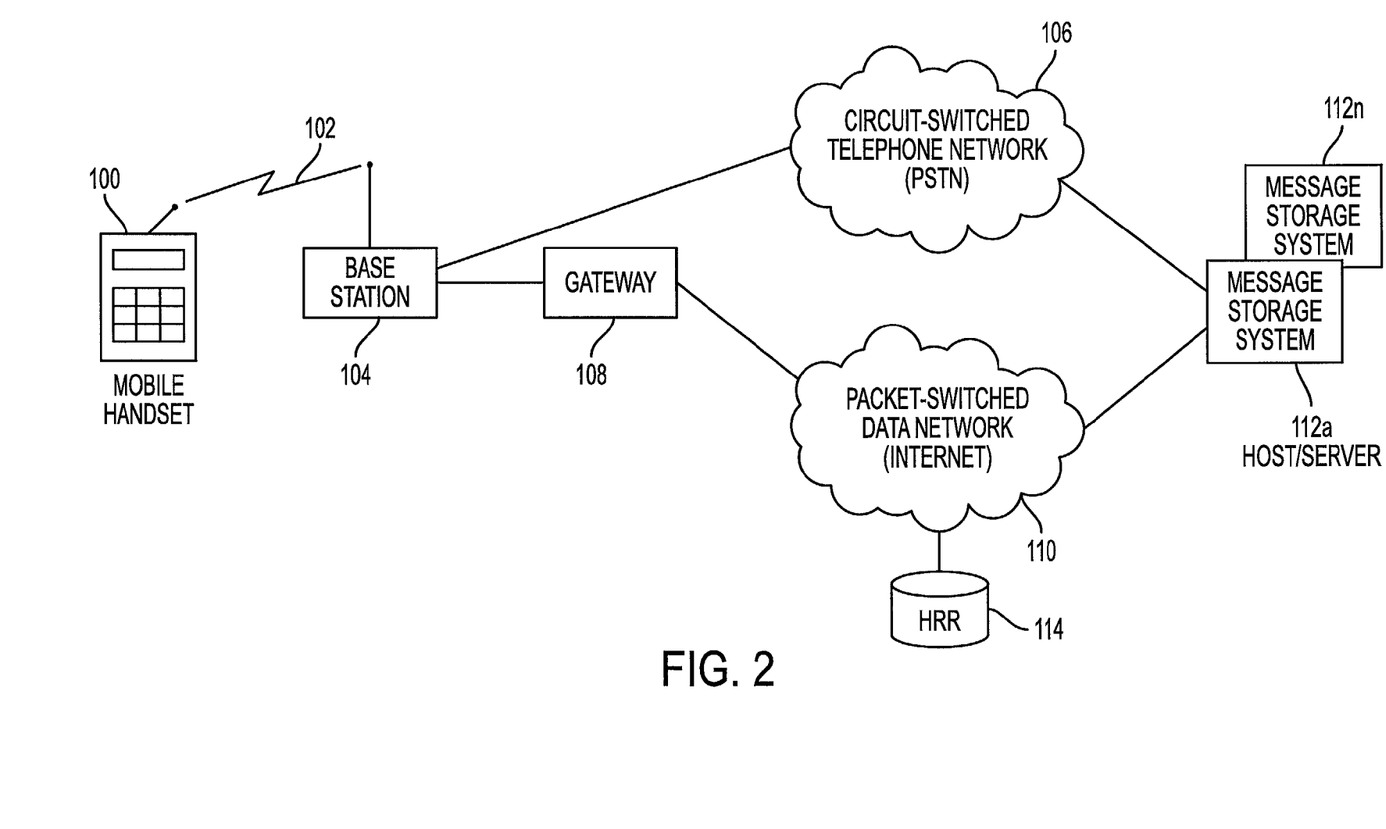
FIG. 2 is a block diagram of a wireless system in which a wireless handset is interconnected to a message storage system according to the present invention.

As illustrated in FIG. 2, a wireless mobile system according to a preferred embodiment of the present invention provides at least three logical nodes of handsets 100, message storage systems 112a–112n, and a home resource register database 114 (HRR). In particular, the HRR provides both location information of the message storage system node 112 and message service information. The message service information can be, for example, subscriber mailbox information or message waiting indicator (MWI) data. In the preferred embodiment, the HRR 114 communicates with the message storage system 112 and the handsets 100 via the IP network 110. The HRR 114 is updated responsive to available information relating to subscriber messages in the message storage systems 112. The handsets 100 and message storage systems 112 have access to address and port number information of HRR 114. The logical node of HRR 114 may be implemented on a conventional computer connected to the mobile network.

Further, providing both location and MWI databases on the same node (i.e., the HRR 114), advantageously obviates the need for handset 110 (client) to access the message storage system 112 (server) when no messages are in the mailbox. In contrast, a typical directory service without message service information, the Handset 100 may have to access corresponding message storage systems to verify the message service information even if there is no message waiting. This configuration unnecessarily increases network traffic when one handset belongs to or uses more than one message storage system.

By using the three-node model of handset 100, HRR 114 and message storage systems 112, the handset 100 can, for example, locate a corresponding message storage system 112 based on media type (e.g., voice, video, text) and access message service information, such as MWI. The three-node model provides flexibility/scalability by accommodating any new media message storage system, including efficient addition/removal of message storage systems. Data traffic on the mobile network can be reduced when the handset 100 belongs to more than one message server, because the handset only needs to query the HRR 114 for message service information of all message servers associated with the handset. Further, the three-node model saves data traffic on the more expensive circuit-switched telephone networks (e.g., PSTN) and utilizes the less expensive data traffic via the packet-switched data network. Thus, means is provided for controlling from a mobile handset processing of subscriber messages on the message storage systems 112a–112n via the IP network 110. In particular, means is provided to control processing of voice messages on a voice message storage system 112 via the IP network 110.

The present invention is not limited to the described preferred embodiments. In another embodiment, the HRR 114 as a logical node may be implemented in one of the message storage systems 112 so that one home message storage system can handle both depositing and retrieval of messages to/from all message storage systems on the mobile network. Further, in another embodiment, storing the address of the message storage system 112 on the handset 100 may obviate the directory service function of HRR. Further, in another embodiment only a single message storage system can be allocated to all handsets 100, obviating directory service function of HRR.

The handset 100 provides local message storage, which has advantages. In particular, the present invention can accommodate message processing when network connection is not reliable by using the IP layers, for example, TCP/IP or UDP/IP, to establish connections, reconnections and data recovery and/or resumption due to communication interruptions. Therefore, there is no need for the handset 100 to maintain a near constant connection with the server for message processing as in typical systems providing only remote message storage where network connection is typically stable. In mobile networks maintaining a near constant connection may not be practical (e.g., not cost efficient), or reliable or possible as the handset 100 moves. However, the data networks, such as the IP network, provide more robust data communication protocol layers than the traditional voice channel communications for data communication during poor or unstable network conditions/connections.

Further, the handset 100 can control processing of messages on message storage systems 112 via the IP network 110. In particular, the handset 100 can control processing of voice messages on a voice message storage system 112 via the IP network 110. Therefore, the handset 100 can control processing of voice messages on a voice message storage system without establishing a voice communication channel with the voice message storage system. In the traditional voice mail systems, a caller's call is connected to the VMS over a voice channel for processing messages (e.g., leaving a message). Even in a typical Voice Over IP (VOIP) or Internet telephony system, the call is connected to the VMS for processing messages (e.g., leaving a message). Therefore, in the traditional systems a caller's call is connected to the VMS before the caller can send or retrieve messages. In contrast, in the present invention the handset 100 locally stores the message to be sent without establishing a voice call. A user interface application (e.g., a call flow application in case of processing voice messages) executing on the handset 100 can, for example, obtain message information from a subscriber. The message information can include, for example, address of a recipient-subscriber. In case of message delivery, once the message is recorded locally, the rest of the messaging can be processed automatically by querying message service information from the HRR 114 and transmitting the recorded message via a data channel with a recipient-subscriber message storage system. Similarly, the recipient-subscriber does not need to access a message storage system. The message can be automatically stored to the recipient-subscriber handset 100 by the recipient-subscriber message storage system updating message service information of the HRR 114. The HRR 114 can, for example, alert the recipient-subscriber's handset 100 of the updating, initiating message delivery in the handset 100 without interaction by the recipient-subscriber.

Further, mobile handset message processing according to the present invention advantageously does not depend on real-time communication capabilities. For example, the system of the present invention may not require many real-time system conditions/requirements. For example, VOIP requires network priority functions or bandwidth to support real-time communication. Further, without real-time requirements, during network congestion, the system according to the present invention can advantageously wait until network congestion subsides. Further, as described in more detail below, without real-time requirements if a data packet is lost, the data packet can be resent, which may not be practical in real-time communication because of delay. The handset 100 can process a message via a data channel (IP network) between the handset 100 and a message storage system 112. The handset processing via the IP network comprises transmitting and receiving data units that includes actual content of subscriber messages, determining whether to retransmit data, retransmitting data and presenting the subscriber messages to the subscriber. Further, because the IP network does not need to support a priority real time class for messaging, the system according to the present invention can use strong compression schemes for messaging depending on design requirements. Therefore, the present invention provides mobile handset messaging even during poor network conditions.

Figure 3:
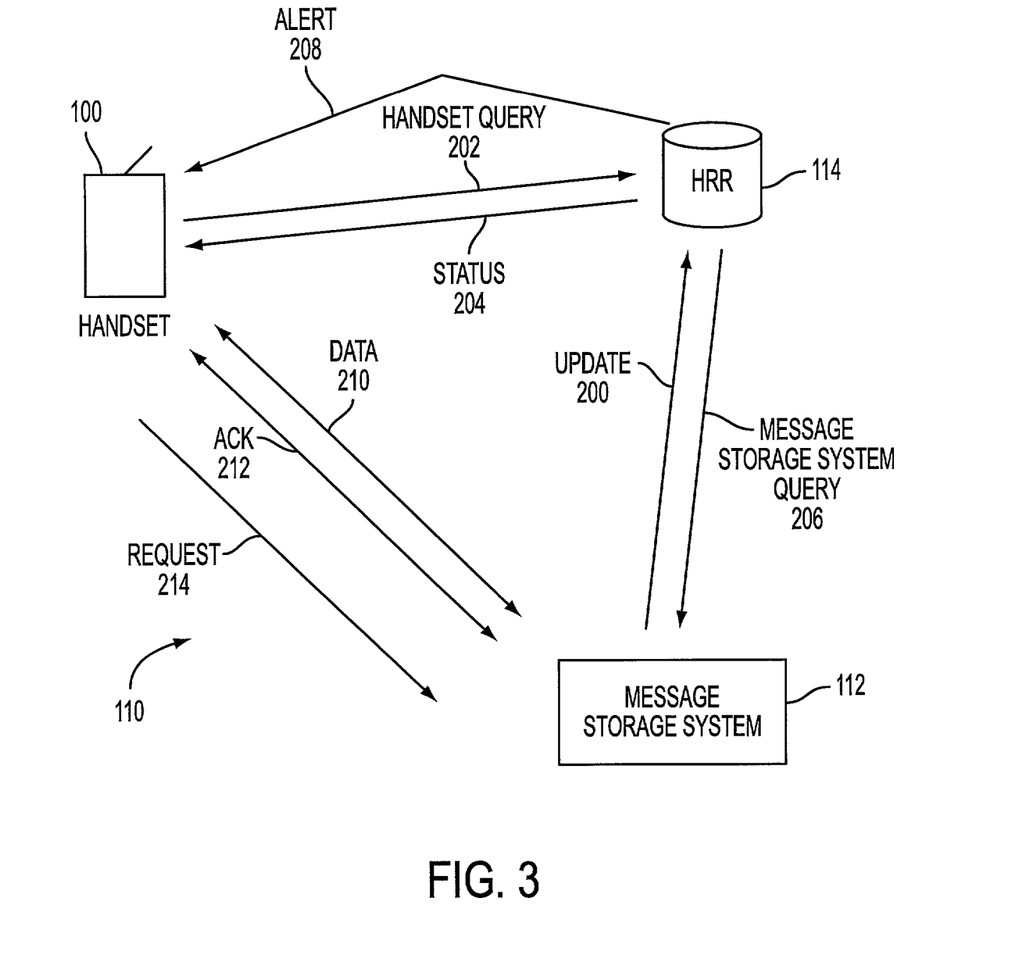
FIG. 3 is a flow diagram that illustrates exemplary interactions among the components shown in FIG. 2.

FIG. 3 is a diagram illustrating the nodes and an exemplary application layer protocol for mobile network IP messaging as used in an embodiment of the present invention. In case of using IP on the mobile network, the handset 100 may access the IP network 110 through conventional techniques, for example, via a proxy gateway (not shown). The handset 100 sends an HRR Handset Query message 202 to the HRR 114 to query address of a message storage system 112 for delivering a subscriber message to the message storage system or to query message service information for retrieving any subscriber messages from the message storage systems. Alternatively, in another embodiment (as described in more detail below) the HRR 114 alerts the handset 100 of the message service information to retrieve subscriber messages from the message storage systems. In case of the message storage system 112 being a VMS, the address can be a handset's home VMS when retrieving or be the recipient's home VMS when depositing. Once the VMS address is received, handset 100 can initiate, for example, a TCP connection to the VMS 112. The handset 100 would be a TCP client and the VMS 112 would be a TCP server. On the established TCP connection, the handset 100 can either retrieve or deposit messages from/to the message storage system 112.

There are two categories of application layer protocol messages in the preferred embodiment of the present invention: HRR related messages (HRR messages) and message storage system related messages, which include subscriber data (messages). In particular, storage system related messages are between the handset 100 and the message storage system 112 to process subscriber messages (i.e., delivery, retrieval, editing, etc. of voice, video, audio, text, data, etc. messages).

The protocols between the three logical nodes of HRR 114, the message storage system 112 and Handset 100 are not limited to the described exemplary protocols. For example, the described exemplary application layer protocol is not limited to a particular lower layer protocol and can support transport layers, such as TCP, UDP, or be implemented with Real-Time Streaming Protocol or Real-Time Transport Protocol to transfer multimedia content (i.e., subscriber messages) to the handset 100. Further, the present invention is not limited to the exemplary application layer protocol message formats described herein and other formats may be used. Further, in the embodiment implementing the HRR 114 in one of the message storage systems 112 so that one home message storage system 112 handles both depositing and retrieval of messages to/from all other message storage systems 112 on the mobile network, an application layer protocol between HRR 114 and Handset 100 and between HRR 114 and message storage system 112 may be obviated. Therefore, the following embodiments and certain alternatives are for purposes of illustration and not limitation.

FIG. 3 shows the HRR related Update, Query and Status messages between the HRR 114 and the message storage system 112 and between the HRR 114 and the handset 100. The message storage system 112 sends an HRR Update message 200 to update the HRR 114 database. The HRR 114 updates address and message service information (e.g., MWI) of the message storage system 112 for each handset 100 by receiving the Update message 200. As shown below, the HRR Update message 200 comprises a message type "update," service type (e.g., voice, text, video, etc.), handset ID (e.g., phone number), MWI information and address information of the message storage system 112 (i.e., IP address, UDP port number and TCP port number).

Message Type: "Update"
Service Type: "Voice", "Text", "Video" or etc
Handset ID: can be, for example, the handset's phone number or MIN
Status: message service information (e.g., MWI)
Address: message storage system address (i.e., IP Address, UDP and TCP port numbers)

The handset 100 sends an HRR Handset Query message 202 to the HRR 114 to query the status and address of the handset's home message storage system. As shown below, the HRR Handset Query message 202 format comprises:

Message Type: "Query"
Service Type: "Voice", "Text", "Video" or etc
Handset ID: can be, for example, the handset's phone number or MIN The HRR 114 sends an HRR Status message 204 to handset 100 in response to receiving the HRR Handset Query 202. The HRR Status message 204 can provide a recipient's message storage system address when depositing/sending subscriber messages to another subscriber. Further, the HRR Status message 204 can provide message service information of the handset 100 in response to an HRR Handset Query message 202 checking the status of the handset's own mailbox. The message service information includes, for example, address of the message storage system storing the handset's messages for multiple services (e.g., voice, video, text, etc.). The handset 100 may periodically query the HRR 114 according to desired design specification. As shown below, the HRR Status message 204 format comprises:

Message Type: "Status"
Service Type: "Voice", "Text", "Video" or etc
Handset ID: can be, for example, the handset's phone number or MIN
Status: message service information (e.g., MWI). MWI information can be ON/OFF indicative of messages waiting or the actual number of the message. In systems of multiple services (e.g., voice video, text, etc.), the MWI field can be enhanced to include other service specific data.
Address: message storage system address (i.e., IP Address, UDP and TCP port numbers).

The HRR 114 can also send an HRR Message Storage System Query 206 to the message storage systems 112 if the HRR 114 does not contain the address of a home message storage system for a queried handset 100. For example, the HRR 114 can send the Query 206 using a round robin method or broadcast method to all message storage systems until the HRR 114 receives a responsive Update 200 identifying the address of the home message storage system of the handset 100. As shown below, the HRR Message Storage System Query 206 format comprises:

Message Type: "Query"
Service Type: "Voice", "Text", "Video" or etc
Handset ID: can be, for example, the handset's phone number or MIN In another embodiment the HRR 114 can alert the handset 100 by sending an HRR Alert message 208 to the handset 100. In particular, the Alert 208 notifies the handset 100 of message service information (e.g., MWI). Because the IP address of the handset 100 changes as the handset moves, the HRR 114 may not initiate communication with the handset 100 using messages over typical TCP/IP connections. However, the HRR 114 could initiate communication with the handset 100 using, for example, a mobile phone Short Message Service (SMS), Periodic Query model (periodically establishing TCP connection to the HRR 114) or the Wireless Application Protocol (WAP) push model. The Alert 208 format can be similar or the same as the HRR Status message 204 format.

A Data message 210 transfers actual content of a subscriber message between the message storage system 112 and the handset 100. As described in more detail below, the subscriber message can be segmented into one or more packets, the packets being transferred via Data messages 210.

As shown below, the Data message 210 format comprises:
Message Type: "Data"
Service Type: "Voice", "Text", "Video" or etc
Recipient Handset ID: can be, for example, the message recipient (subscriber) handset's phone number or MIN (can, for example, include multiple IDs for group messaging as described in more detail below)
Sender Handset ID: can be, for example, the message sender (subscriber) handset's phone number or MIN
Message ID: unique identification for each subscriber message.
Total Packets: Total number of packets for this subscriber message.
Packet number: A sequential number of each packet
Length of data: Length of the following data section
Data: Actual data (subscriber message) depending on service type (e.g., digitized voice, video, text, or etc.)

An ACK message 212 is a message responsive/corresponding to the Data message 210. Every time a Data message is received, an ACK message can be sent to the sender confirming delivery. The ACK message 212 can also be used to initiate resend of a Data message.

As shown below, the Ack message 212 format comprises:
Message Type: "Ack"
Service Type: "Voice", "Text", "Video" or etc
Recipient Handset ID: can be, for example, the message recipient (subscriber) handset's phone number or MIN (can, for example, include multiple IDs for group messaging as described in more detail below)
Sender Handset ID: can be, for example, the message sender (subscriber) handset's phone number or MIN
Message ID: unique identification for each subscriber message.
Total Packets: Total number of packets for this subscriber message.
Packet number: A sequential number of each packet
Status OK, No Good (NG), Resend, Quit or other status In the preferred embodiment, the handset 100 connects, for example via a TCP connection, with the message storage system 112. Once connected to the message storage system 112, the handset 100 sends Request messages 214 to the message storage system 112 to request data from the message storage system to the handset. For example, the handset 100 sends a Request message 214 to the message storage system 112 requesting the message storage system 112 to begin transmission of a Data message 210 from the message storage system 112 to the handset. Request messages 214 can initiate receiving Data messages 210 from the message storage system 112 to retrieve a subscriber message by handset 100. Further, if the Handset 100 has limited resources, such as storage capacity, so that the Handset 100 cannot receive Data messages 210 when local storage is full, the Handset 100 can control data transmission by not sending a Request message 214 to the message storage system 112. Further, the Request message 214 can be used in managing retransmission of packets in case of lost or corrupted Data messages 210.

As shown below, the Request message 214 format comprises:
Message Type: Request
Service Type: "Voice", "Text", "Video" or etc.
Handset ID: can be, for example, the handset's phone number or MIN
Message ID: unique identification of the subscriber message requested (specified if the previous Data message 210 transmission was interrupted/corrupted).
Number of Total Packets: Total number of packets requested (specified if the previous Data message 210 transmission was interrupted/corrupted)
Packet Number: The sequence number of packets requested (specified if the previous Data message 210 transmission was interrupted/corrupted)

Figure 4:
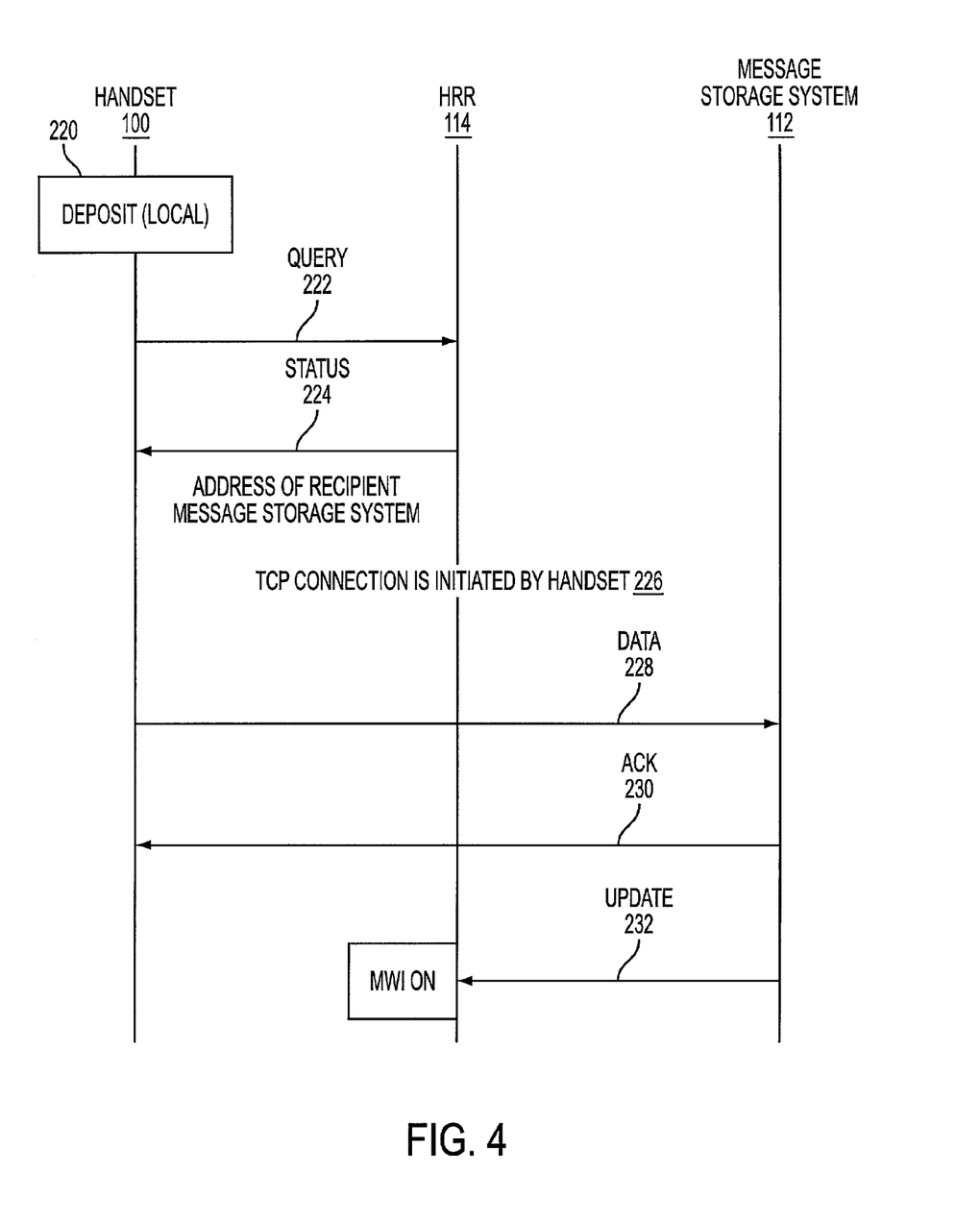
FIG. 4 is a flow diagram that illustrates exemplary interactions among the components shown in FIG. 2 for depositing subscriber messages in the message storage system from the wireless handset.

FIG. 4 is a flow diagram illustrating the flow of application layer protocol messages for mobile network IP messaging according to the present invention in more detail. In particular, FIG. 4 is a flow diagram illustrating the flow of application layer protocol messages when a subscriber using the handset 100 deposits a message (e.g., voice, text, video, etc.) for another subscriber in the message storage system 112 (e.g., VMS). The subscriber at 220 records a message stored locally in the handset 100. Therefore, for example, a voice message can be recorded to a local storage of handset 100 regardless of whether the handset 100 is in radio range or m communication with the base station 104. Local storage of subscriber's messages accommodates background message processing, such as delivery of the message, without requiring the subscriber to establish a communication (data or voice) connection.

The handset 100 at 222 queries to HRR 114 with an HRR Handset Query message 202 about the address of the recipient's VMS. Of course, at 222 the handset 100 is in radio range to communicate with the HRR 114. The HRR 114 at 224 sends the HRR Status message 204 to handset 100. The HRR Status message 204 provides the recipient's VMS address to the handset 100. Next at 226 a TCP connection is established between the handset 100 and the recipient's VMS 112. Although the exemplary embodiment uses a TCP connection at 226, a UDP connection may be used at 226.

The handset 100 at 228 initiates sending the subscriber's voice message to the recipient's VMS using the Data messages 210. The handset 100 prepacketizes the voice message, the Data messages 210 including the packets. The recipient's VMS at 230 sends the ACK messages 212 to the handset 100, which confirm delivery of the Data messages 210. Because of the prepacketization, the Data and Ack messages 210, 212 (as provided in the Data and Ack message formats described above) include message identification, total number of packets information and packet sequence number so that both the sender and receiver (i.e., handset 100 and VMS 112) can determine the number of packets expected and which packets are received. Therefore, if the IP connection is lost during data transmission, means is provided for both the sender and receiver to recover the transmission from the last completed transmission of a packet. Upon receipt of the voice message, the VMS 112 processes the voice message by, for example, storing the voice message in the recipient's mailbox. The VMS 112 at 232 sends the HRR Update message 200 to the HRR 114 to update the message service information (e.g., MWI) of the recipient's handset 100. The sender-subscriber's handset 100 can now delete the locally stored voice message.

Figure 5:
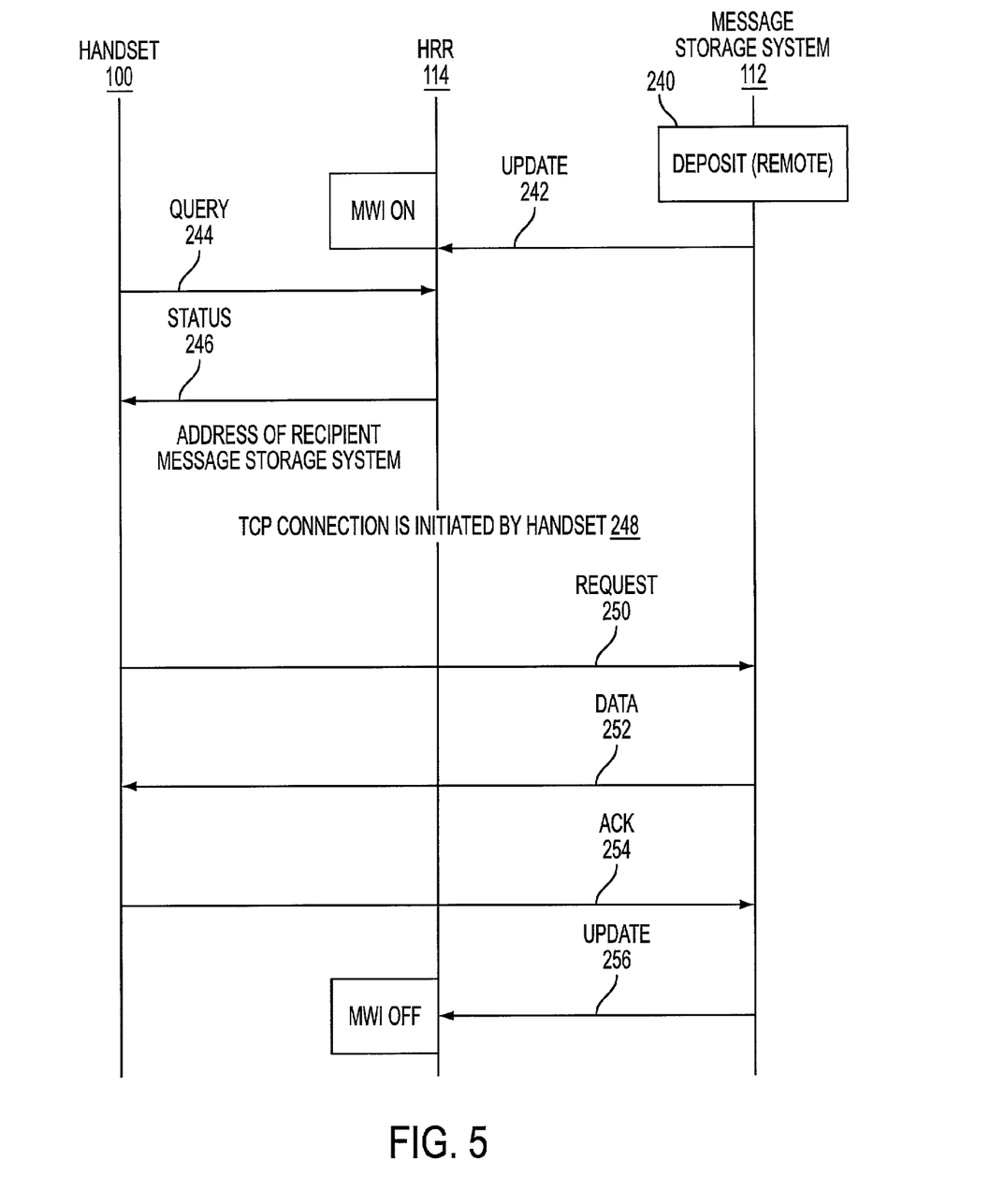
FIG. 5 is a flow diagram that illustrates exemplary interactions among the components shown in FIG. 2 for delivering subscriber messages from the message storage system to the wireless handset.

FIG. 5 is a flow diagram illustrating the flow of application layer protocol messages when the handset 100 automatically retrieves a message (e.g., voice, text, video, etc.) sent by another subscriber from the message storage system 112 (e.g., VMS). When a subscriber receives a mail message (recipient), which is stored at 240 in the subscriber's mailbox in the message storage system 112 (e.g., VMS in case of a voice message), the VMS at 242 sends the HRR Update message 200 to the HRR 114. The HRR Update message 200 provides message service information to the HRR 114. The message service information can be, for example, turning a flag "ON" or "OFF" indicative of waiting messages, the actual number of messages or other service specific data in case of multiple services (e.g., voice, video, text, etc.).

The handset 100 at 244 queries the HRR 114 with the HRR Handset Query message 202. In response to the query, the HRR 114 at 246 sends the HRR Status message 204 to the handset 100. The HRR Status message 204 provides to the handset 100 the message service information (e.g., MWI) of the handset 100 and address of recipient message storage system. For example, an "ON" MWI indicates messages waiting for the subscriber. If the MWI is "ON," at 248 a TCP connection is established between the handset 100 and the VMS 112. Although the exemplary embodiment uses a TCP connection at 248, a UDP connection may be used at 248. In particular, in case of multiple services allocated to different message storage systems, at 248 the handset 100 uses an address of the message storage system (e.g., VMS, Video message server, etc.) storing the corresponding type messages of the handset 100.

The handset 100 at 250 sends the Request message 214 to the VMS 112 to initiate at 252 transmissions of Data messages 210 from the VMS. The handset 100 at 254 sends the ACK messages 212 to the VMS 112, which confirm delivery of the Data messages 210. As described above, both the sender and receiver (i.e., handset 100 and VMS 112) can determine the number of packets expected and which packets are received from the information in the Data message 210 and the Ack message 212. Therefore, if the IP connection is lost during data transmission, both the sender and receiver can recover the transmission from the last completed transmission of a packet. The handset 100 locally stores the voice message for processing by the subscriber. The VMS 112 can, for example, delete the voice message from the recipient's mailbox after delivery of the voice message to the handset 100 or perform other processing. The VMS 112 at 256 sends the HRR Update message 200 to the HRR 114 to update the message service information of the recipient's mailbox. For example, the HRR Update message 200 turns "OFF" the MWI for the recipient's mailbox, indicative of no new messages are waiting.

In the present invention the subscriber message processing described in FIG. 5 can be performed in the background without requiring the subscriber to initiate communication with the message storage system. Once the retrieved subscriber message is stored locally in the handset 100 , the subscriber can control processing (e.g., play, view, edit, forward, etc.) the retrieved message without being in the radio range of the base station 104.

Figure 6:
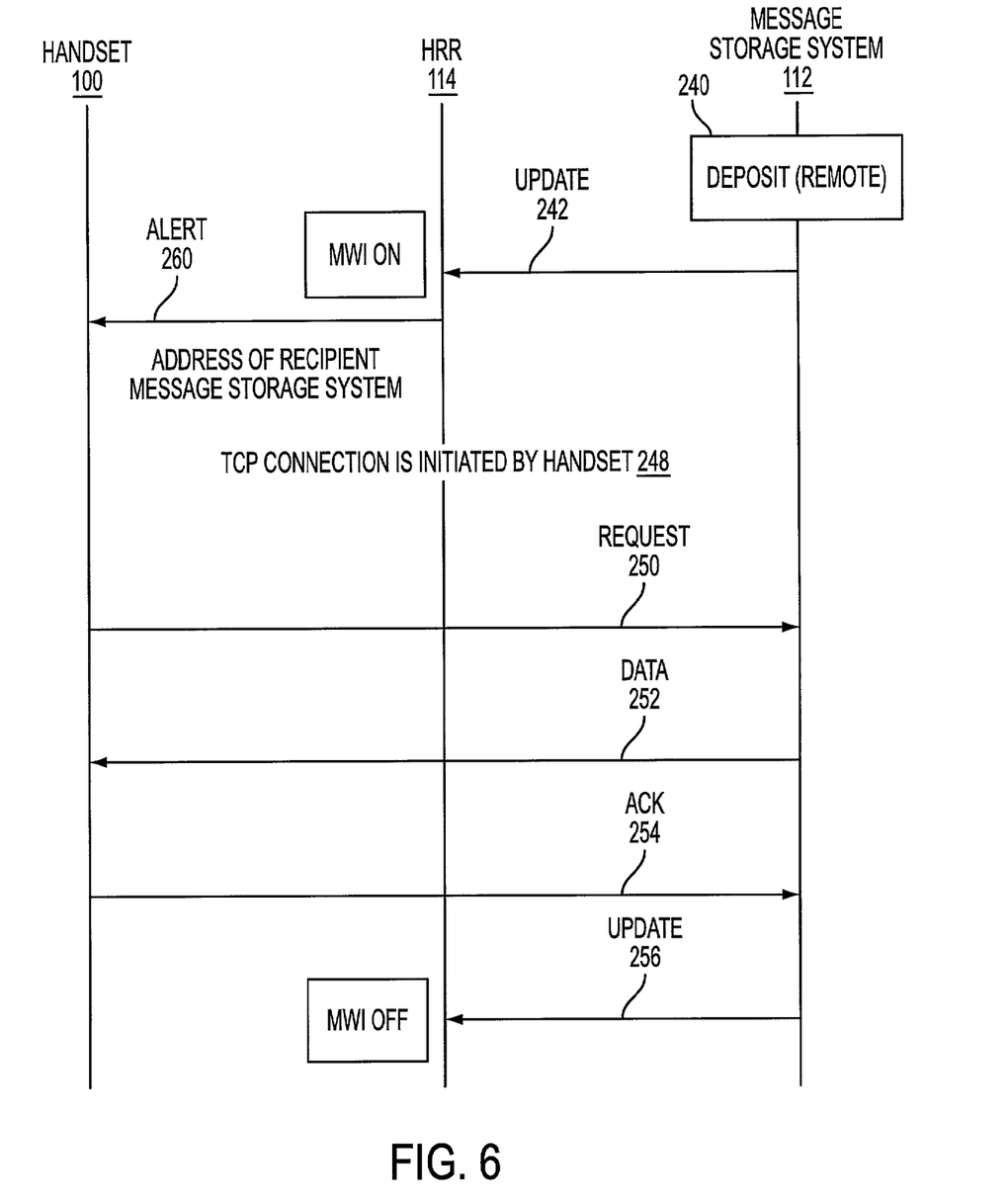
FIG. 6 is a flow diagram that illustrates another exemplary interactions among the components shown in FIG. 2 for delivering subscriber messages from the message storage system to the wireless handset.

Although the exemplary embodiment of FIG. 5 uses the HRR Handset Query message 202 for message service information, the present invention is not limited to use of the HRR Handset Query message 202 and other methods can be used to notify the handset 100 of message service information. For example, FIG. 6 is a flow diagram illustrating the flow of application layer protocol messages when the HRR 114 at 260 automatically alerts the handset 100 of message service information using the HRR Alert message 208. As described above, the HRR Alert message 208 can be transmitted to the handset 100 using a mobile network service, such as the SMS.

The present invention can support group messaging. Group messaging is the case when a subscriber sends one message to more than one recipient at the same time. From the subscriber's perspective, with reference to FIG. 4, the subscriber at 220 records a message and specifies more than one recipient address via a call flow application executing in the handset 100. Next, the locally recorded message must be delivered to the specified recipients' mailboxes, which may reside on the different message storage systems.

In one group messaging embodiment, the handset 100 can send the same message to different mailboxes by establishing individual sessions to each message storage system 112 of the recipients. Therefore, the handset 100 treats the recorded message as multiple messages to multiple recipients. Again, this can be achieved by the application executing in the handset.

In another preferred group messaging embodiment, the Handset ID field of the Data message 210 can be expanded so that the Handset 100 can send a subscriber message with multiple recipients to a message storage system 112. When receiving such multi-recipient message, the message storage system 112 can store the subscriber message in the different mailboxes for recipients whose mailboxes are in the message storage system. The message storage system 112 can send the subscriber message to other message storage systems when mailboxes of recipients reside on the other message storage systems. The message storage system can, for example, receive the address of message storage systems of recipients by sending a query to the HRR 114 and receiving a status protocol message (not shown in FIG. 3) from the HRR 114. Therefore, the handset 100 only needs to send one message to a message storage system through the relatively expensive and unstable mobile radio network. The message storage system forwards the subscriber message to group recipients using the less expensive and stable fixed network. The message storage system can send an Update message 200 to the HRR 114 to update the message service information of the handset 100 sending the group message, confirming status/delivery to the group.

Although a few preferred embodiments of the present invention have been shown and described, it would be appreciated by those skilled in the art that changes may be made in this embodiment without departing from the principles and spirit of the invention. The scope of the present invention is defined in the claims and the claims' equivalents.

What is claimed is:

1. A process, comprising:
   recording a voice message for a recipient subscriber in a portable wireless telephone without establishing a voice or data channel with the message storage system;
   querying according to a packet-switched-data network application layer data transfer protocol, address of a recipient-subscriber message storage system from a resource database via a packet-switched-data network between the portable wireless telephone and the resource database;
   transmitting the voice message to the recipient-subscriber message storage system, according to the packet-switched-data network application layer data transfer protocol, via a packet-switched-data network between the portable wireless telephone and the recipient-subscriber message storage system;

storing the transmitted message in a mailbox for the recipient subscriber in the recipient-subscriber message storage system;

updating according to the packet-switched-data network application layer data transfer protocol, message service information of the recipient subscriber in the resource database by the recipient-subscriber message storage system according to the storing in the mailbox via a packet-switched-data network between the resource database and the recipient-subscriber message storage system;

alerting automatically by the resource database according to the packet-switched-data network application layer data transfer protocol, a recipient-subscriber portable wireless telephone with the message service information via a packet-switched-data network between the resource database and the recipient-subscriber portable wireless telephone;

establishing a packet-switched-data network between the recipient-subscriber portable wireless telephone and the recipient-subscriber message storage system;

processing according to the packet-switched-data network application layer data transfer protocol, the voice message in the recipient-subscriber portable wireless telephone via the packet-switched-data network between the recipient-subscriber portable wireless telephone and the recipient-subscriber message storage system; and updating according to the packet-switched-data network application layer data transfer protocol, the message service information of the recipient subscriber in the resource database by the recipient-subscriber message storage system according to the voice message processing in the recipient-subscriber portable wireless telephone via a packet-switched-data network between the resource database and the message storage system.

2. The process according to claim 1, wherein the processing further comprises:

receiving data packets corresponding to the voice message from the recipient-subscriber message storage system via the packet-switched-data network; and presenting the voice message to the recipient subscriber on the recipient-subscriber portable wireless telephone.

3. The process according to claim 1, wherein the transmitting and processing of the voice message further comprises:

transmitting and receiving, respectively, data units comprising data packets corresponding to the voice message, identification information of the voice message, total number of the data packets information and data packet sequence number information; and determining whether to retransmit data packets;

retransmitting data packets responsive to the determining using the identification information, the total number of the data packets and the data packet sequence number information.

4. The process according to claim 1, further comprising:

transmitting, by the resource database, to the recipient-subscriber message storage system, a query for the packet-switched-data network address of the recipient-subscriber message storage system, in response to the querying from the resource database by the portable wireless telephone, according to a packet-switched-data network application layer data transfer protocol via a packet-switched-data network between the resource database and the recipient-subscriber message storage system.

* * * * *